May 30, 1967 G. D. COOPER 3,322,946
REFLECTOR FOR REFLECTING COLOR CORRECTED LIGHT AND HEAT
Filed Nov. 27, 1964 2 Sheets-Sheet 1
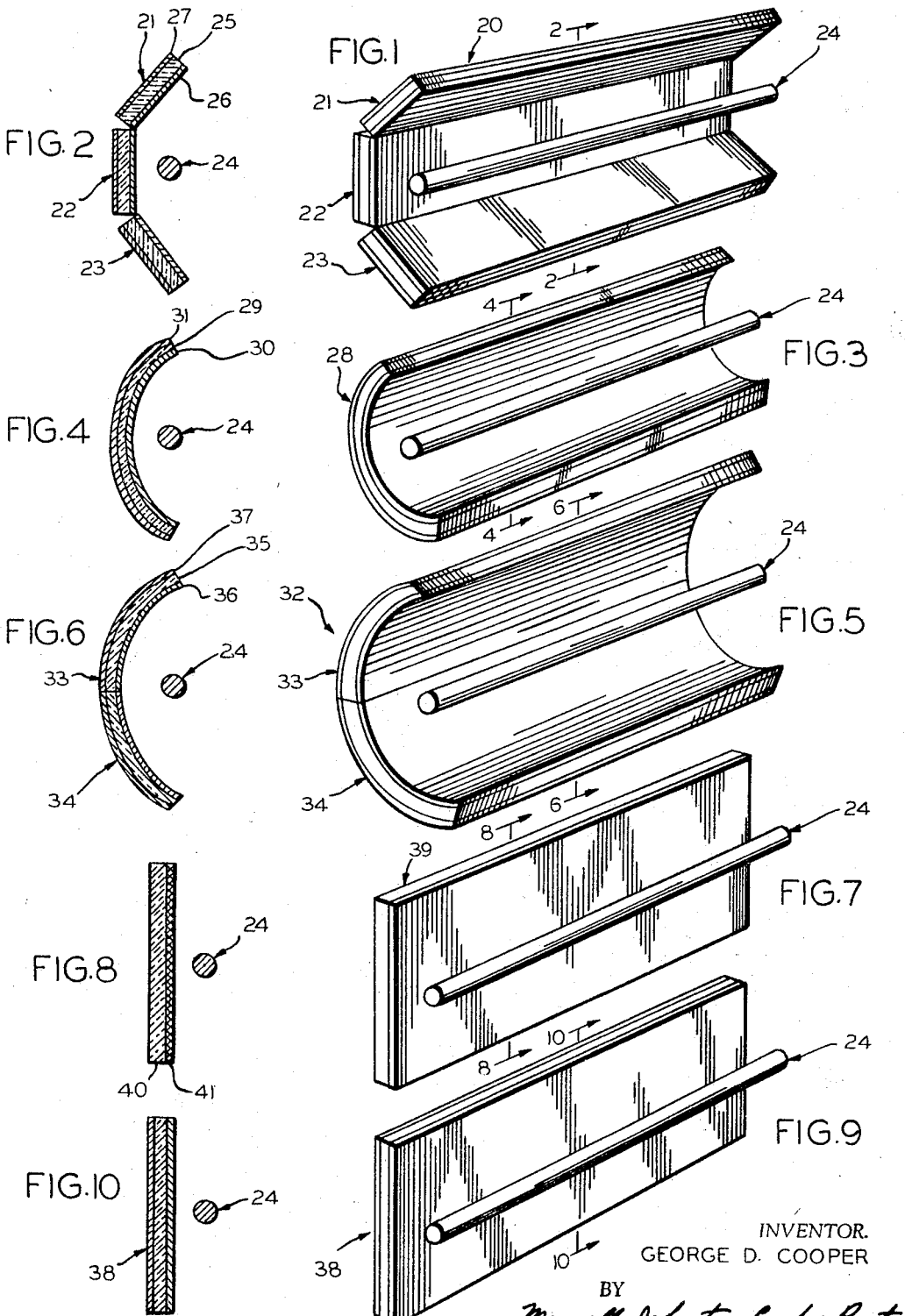
INVENTOR.
GEORGE D. COOPER
BY
Mazzell, Johnston, Cook & Root
ATTORNEYS

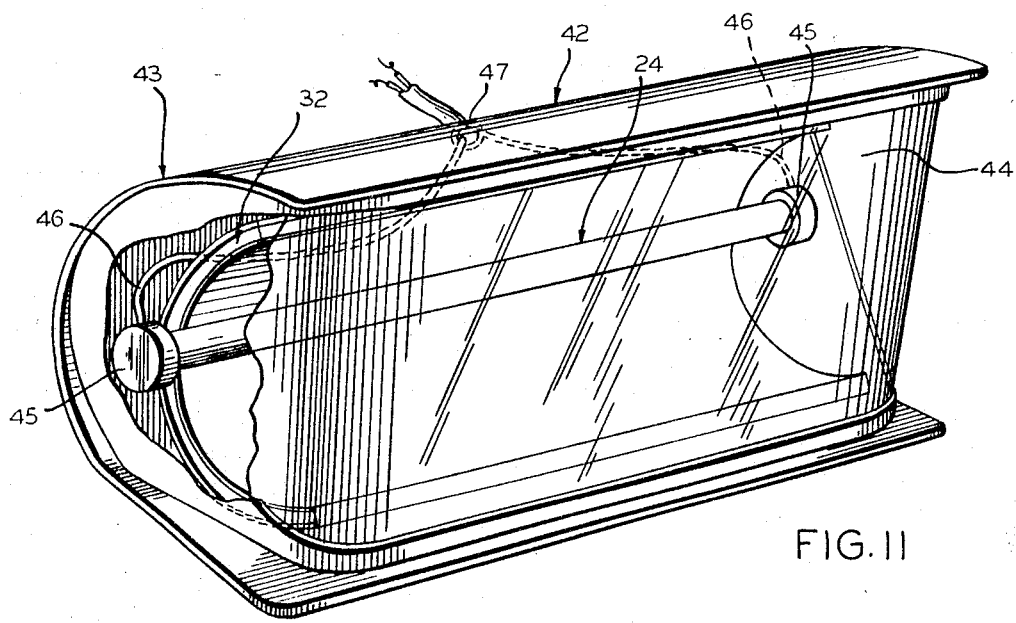
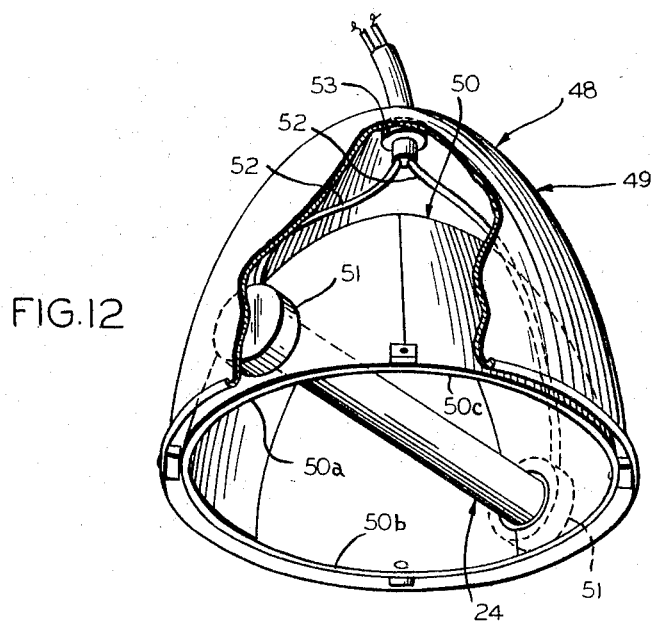

United States Patent Office 3,322,946
Patented May 30, 1967

3,322,946
REFLECTOR FOR REFLECTING COLOR
CORRECTED LIGHT AND HEAT
George D. Cooper, 1136 Vista Place,
Edmonds, Wash. 98020
Filed Nov. 27, 1964, Ser. No. 414,102
8 Claims. (Cl. 240—41.35)

This invention relates in general to a reflector for reflecting color corrected light and heat, and more particularly to a light unit including a source of visible and infrared radiant energies in combination with a reflector capable of reflecting substantially all of the infrared radiant energies and a predetermined portion of the visible radiant energies to obtain a color corrected light, and still more particularly to a reflector for use in outdoor and indoor flood or spotlights where it is not objectionable to eject the heat generated by the source of radiant energy outward through the front of the light unit.

The reflector of the present invention comprises a transparent carrier or substrate having a coating means thereon capable of reflecting substantially all of the infrared radiant energy and that desired part of the visible radiant energies in order to obtain a color corrected beam of visible radiant energy. The carrier may be of any suitable transparent material, but it has been found that glass is preferable. Moreover, the glass should be of a heat resisting type. The reflector shape may be flat, curvate or a combination of the two, and in one piece or a plurality of pieces. While the coatings may be of any desirable material, it is preferable that they be of the type known in the industry as "dichroics," "multi-films," or "multi-layer," such coatings being capable of reflecting certain radiant energies while transmitting other radiant energies. Such coatings are also sometimes termed "thermal evaporative" or "vacuum deposited." The source of radiant energy may take any desired form, such as incandescent, arc, gas vapor, or the like.

Heretofore, a major problem confronting the lighting industry in the operation of light units especially adapted for outdoor or indoor flood or spot operation is the heat generated by the source of radiant energy employed to obtain the visible light. This problem has been especially acute where high intensity sources of radiant energies are needed and employed, and as one example, where light units employ the newly developed iodine-quartz lamps now on the market. Specific problems encountered are the burning up of lamp sockets, destruction of lamp bases, and danger to electrical wiring carried in the housing of a lamp unit. In fact, it has been difficult for some manufacturers to obtain Underwriters' Laboratories' approval on certain light fixtures merely because of the heat problem. One recently marketed lamp fixture, by necessity, resorted to the use of a blower in the fixture housing to rid the housing of the extreme heat generated. Other manufacturers have sacrificed certain desired results in order to obviate the heat problem.

Accordingly, it is an object of the present invention to obviate the above mentioned difficulties and to provide an improved reflector for light units.

Another object of this invention resides in the provision of a reflector capable of reflecting color corrected light and heat.

Still another object of this invention is in the provision of a reflector capable of reflecting substantially all of the infrared radiant energies and substantially all of the visible radiant energies by permitting such visible energies to pass therethrough so as to obtain a desirable color temperature of the reflected visible energies.

A further object of the present invention is to provide an improved reflector for light units, and especially useful for outdoor and indoor flood or spot operation.

A still further object of this invention is to provide a reflector adapted to be employed in combination with a source of radiant energy wherein the reflector will reflect substantially all of the infrared radiant energies in the general range of .80 to 1.5 microns and substantially all or any part of the visible radiant energies in the general range of .40 to .75 micron while permitting the passage therethrough or absorption of certain of the near red radiant energies so that the reflected visible radiant energies will have a desirable color temperature.

A still further object of this invention is in the provision of a light unit including a source of infrared and visible radiant energies in combination with a reflector, wherein the reflector includes a transparent carrier and coating means thereon capable of reflecting substantially all of the infrared radiant energies and a predetermined portion of the visible radiant energies to define a colored beam of visible radiant energies.

Another object of this invention resides in the provision of a reflector including a transparent carrier having a coating on one side thereof reflecting substantially all of the infrared radiant energies and a coating on the other side thereof reflecting a selected portion of the visible radiant energies.

Still another object of this invention is in the provision of a light unit including a source of visible and infrared radiant energies and a reflector having a transparent carrier and a coating on one side thereof for reflecting substantially all of the infrared radiant energies in the general range of .8 to 1.5 microns and the coating on the other side of the carrier for reflecting substantially all of the visible radiant energies in the general range of .40 to .75 micron but permitting the passing of at least a portion of the visible radiant energies in the general range of .63 to .69 micron in order to produce a reflected visible radiant energy that is corrected for color and has a desirable color temperature.

Other objects, features and advantages of the invention will be apparent from the following detailed disclosure, taken in conjunction with the accompanying sheets of drawings, wherein like reference numerals refer to like parts, in which:

FIG. 1 is a perspective view of a reflector shown diagrammatically with the source of radiant energy in accordance with the present invention;

FIG. 2 is a vertical sectional view taken substantially along line 2—2 of FIG. 1;

FIG. 3 is a perspective view of a reflector in accordance with the invention and of a different shape than that shown in FIGS. 1 and 2;

FIG. 4 is a vertical sectional view taken substantially along line 4—4 of FIG. 3;

FIG. 5 is another form of reflector in accordance with the present invention shown diagrammatically in combination with a source of radiant energy;

FIG. 6 is a vertical sectional view taken substantially along line 6—6 of FIG. 5;

FIG. 7 is a perspective view of still another form of reflector in accordance with the present invention;

FIG. 8 is a vertical sectional view taken along line 8—8 of FIG. 7;

FIG. 9 is a perspective view of still another form of reflector according to the present invention;

FIG. 10 is a vertical sectional view taken substantially along line 10—10 of FIG. 9;

FIG. 11 is a perspective view with parts broken away for purposes of clarity of a light unit in accordance with the present invention; and FIG. 12 is a perspective view of another light unit with parts broken away illustrating the use of a reflector in accordance with the present invention.

Referring now to the drawings and particularly to FIGS. 1 and 2, the reflector of the present invention is illustrated and generally designated by the numeral 20 as including flat sections 21, 22 and 23, in combination with a source of radiant energy 24. The source of radiant energy 24 is illustrated diagrammatically and may take the form of an incandescent lamp, a gas vapor lamp, an arc lamp, a pulsed xenon arc lamp, or any other suitable source of radiant energy. Any of these sources produces both visible and invisible radiant energies, the visible radiant energies being those that the human eye sees, while the invisible radiant energies being those that the human eye does not see. With respect to the electromagnetic spectrum, the visible radiant energies are generally considered in the range .38 to .76 micron, or the general range of .40 to .75 micron, while all other radiant energies of the spectrum are generally considered invisible. The major portion of the spectrum above the upper limits of the visible radiant energies is considered as constituting the infrareds, although only a portion of the infrareds in the range .8 to 1.5 microns is generally considered to constitute the "heat" of the spectrum, especially as felt by humans. When further referring to the infrareds in this application, it should be assumed that reference is primarily made to the heat portion thereof.

The reflector sections 21, 22 and 23 are each identical and therefore only one will be described in detail. Taking the section 21, it comprises a transparent carrier or substrate 25 that may be made of any suitable material although glass of a heat resisting type has been found preferable. Yet if another transparent material can withstand the heat generated by the source of radiant energy 24, it could also be employed as the carrier. Coating means is provided on the transparent carrier 25, and in this embodiment a coating 26 is applied to the side of the reflector 21 being adjacent to the source of radiant energy 24 which amounts to a "heat barrier" in that the coating is capable of reflecting substantially all of the infrared radiant energies, especially in the range .8 to 1.5 microns, while transmitting all of the other radiant energies produced by the source 24. Preferably, the coating 26 will reflect over ninety percent and upwards of one hundred percent of the infrareds in the aforementioned range. It should be understood that this coating can be adjusted to reflect whatever wavelengths desired. A coating 27 is applied to the back surface or sometimes called "second surface" of the reflector 21 which is capable of reflecting any selected portion of the visible radiant energies in the range .38 to .76 micron. In one instance, if the desired light to be reflected is to be of a particular color, the coating 27 will serve to reflect that color band and transmit all other visible radiant energies to produce a colored light. Another example would be where a so-called "white" light would be desired or a color corrected light wherein the coating 27 would reflect substantially all of the visible radiant energies while permitting a portion of the near reds to be transmitted to produce a reflected light column having a desired Kelvin color temperature. Preferably, the color temperature should be at least 3200° K., although this may be adjusted according to what is needed. For example, a light for indoor colored photographic purposes should have a color temperature of about 3300–3400° K. Yet a light suitable for display of different colored items should be between 3600–4000° K. In the latter instance, a portion of the near reds in the range .63 to .69 micron could be transmitted through the coating 27 to regulate the color temperature of the visible radiant energies reflected by the coating.

The source of radiant energy 24 may be an iodine-quartz lamp of high intensity and employed in combination with a reflector such as the reflector 20 for indoor and outdoor flood or spot lighting where reflection of the heat by the reflector would not be undesirable. Moreover, the light reflected being color corrected would not be affected by the reflection of the infrared radiant energies.

The coatings 26 and 27 may be of any desirable type, but preferably of the type known in the industry as "multifilms," thermal evaporative, vacuum deposited, or dichroics, wherein a plurality of layers of material are deposited on the substrate for defining the coating and for reflecting and transmitting selected wave lengths of radiant energies.

As already mentioned, the shape of the reflector may take any desired form, and other forms are shown in FIGS. 3–12. While the reflector 20 in FIG. 1 comprises a plurality of flat segments arranged adjacent the source of radiant energy 24, it can be appreciated that the reflector may be arcuate or curvate in shape such as the single piece reflector 28 shown in FIGS. 3 and 4. This reflector also is defined by a transparent carrier having coatings on opposite sides thereof for reflecting the visible and infrared radiant energies. Particularly, the reflector includes a curvate transparent carrier 29 having an infrared reflecting coating 30 on the front surface thereof facing the source of radiant energy 24 and a color correcting visible reflecting coating 31 on the rear face thereof for reflecting color corrected light.

The embodiment of FIGS. 5 and 6 discloses a reflector 32 that is also curvate but differs from the reflector 28 in that it is segmental and includes segments or sections 33 and 34. It is well known that in applying coatings of the type herein referred to, it is easier and cheaper to apply a coating to a surface having a slight curvature than one having a great curvature. While only two segments are shown in the embodiments of FIGS. 5 and 6, it should be appreciated that any number of segments may be employed. Again, each segment includes a transparent carrier 35 having a coating 36 on the front surface for reflecting the infrared radiant energies and transmitting all other radiant energies, and a coating 37 on the rear surface thereof for reflecting substantially all of the visible radiant energies but permitting such to pass as to provide color corrected light.

The embodiment of FIGS. 9 and 10 differs from the other embodiments in that it discloses a reflector 38 composed of a single flat segment arranged in spaced relation with the source of radiant energy 24. The segment 38 is identical to any one of the segments 21, 22 or 23 of the embodiment of FIGS. 1 and 2, with the exception of possibly being of a slightly different size, and wherein it would include a carrier coated on opposite sides in a manner similar to the embodiment of FIGS. 1 and 2.

Referring now to FIGS. 7 and 8, another embodiment of the invention is disclosed wherein a flat reflector 39 is shown in combination with a source of radiant energy 24. This reflector includes a transparent carrier or substrate 40 having a coating 41 on the front surface thereof which reflects substantially all of the infrared radiant energies in the range .8 to 1.5 microns, as well as substantially all or part of the visible radiant energies in order to produce a colored or color corrected light. Essentially, the coating 41 combines the functions of the coatings 26 and 27 of the reflector segment 21 in the embodiment of FIGS. 1 and 2. While the coating 41 is shown on the front surface of the carrier 40, it will be appreciated that it could be placed on the rear surface if so desired. Moreover, while the infrared reflecting coating of the other embodiments is described as being on the front surface of the reflector, it could be mounted on the rear surface while the visible reflecting surface could be mounted on the front surface. However, the arrangement of the coatings that is preferred is like that shown in the drawings and heretofore described.

It should also be appreciated that the infrared reflecting coating and the visible reflecting coating may be applied to the inside and outside surfaces, respectively, of an incandescent or other type of lamp, thereby eliminating the necessity of utilizing a separate reflector in a light fixture.

Referring now to FIG. 11, a light unit, generally indicated by the numeral 42 utilizing the present invention, is shown wherein it includes a reflector arrangement like that in FIGS. 5 and 6 and designated by the like numeral 32 as being mounted within a trough-shaped housing 43 closed at the forward end by a transparent lens 44. The source of radiant energy 24 arranged with the reflector 32 is shown mounted in opposite end sockets 45 that are suitably positioned within the housing and that have wires 46 extending therefrom and in the area between the housing 43 and the back side of the reflector 32 to a fitting 47 in the housing 43. The wires are then carried through the fitting 47 and out of the housing to be connected to a source of electrical potential. Because the reflector 32 reflects all of the heat forward through the front of the housing 43 and through the lens 44, the area within the housing in back of the reflector 32 remains cool and therefore prevents any possible damage to the insulation on the wires 46. Such a situation is necessary in order to obtain Underwriters' Laboratories' approval on the wiring of a light unit such as shown in FIG. 11.

Another light unit, generally designated by the numeral 48, is shown in FIG. 12 which includes a deep dish-shaped housing or casing 49 having mounted therein a segmented deep-dished reflector 50 and a source of radiant energy 24. The reflector 50 includes relatively pie-shaped compoundly curved segments 50a, 50b and 50c suitably mounted within the housing and wherein openings are provided in the reflector 50 through which the opposite ends of the tubular source of radiant energy 24 extend to be received in sockets 51 that are suitably supported by the housing 49. Wires 52 extend from the sockets 51 and to a fitting 53 in the bottom of the casing 49. The wires then extend through the fitting 53 and out of the housing 49 and to a suitable source of potential energy. Again, the area defined behind the reflector 50 and within the housing 49 will remain cool inasmuch as the reflector segments are constructed in a manner in accordance with the present invention and in accordance with the previously described embodiments wherein the heat generated by the source of radiant energy 24 will be ejected or reflected from the fixture. The segments of the reflector 50 may either be constructed in accordance with the particular embodiments of FIGS. 1–6 and 9–10 or in accordance with the embodiments of FIGS. 7 and 8.

In view of the foregoing, it is seen that the present invention provides a reflector for a light unit which overcomes the dangerous heat problem heretofore existing in light units, while at the same time providing a color corrected light capable of producing a polychromatic light or a particular colored light.

It will be understood that modifications and variations may be effected without departing from the scope of the novel concepts of the present invention, but it is understood that this application is to be limited only by the scope of the appended claims.

The invention is hereby claimed as follows:

1. In combination with a source of visible and infrared radiant energies, a reflector arranged adjacent thereto coacting therewith to define a light column for reflecting substantially all of said infrared energies and substantially all of said visible energies impinging thereon except a predetermined portion of the visible energies so that the light column is color corrected, said reflector including a transparent substrate of high-heat resisting material, and coating means on the substrate reflecting at least substantially all infrared radiant energies in the general range of .80 to 1.5 microns and substantially all visible radiant energies in the general range of .40 to .75 micron except such preselected visible energies that the resultant reflected visible energies produce a light column having a predetermined color temperature.

2. In combination with a source of visible and infrared radiant energies, a reflector arranged adjacent thereto coacting therewith to define a light column for reflecting substantially all of said infrared energies and substantially all of said visible energies impinging thereon except a predetermined portion of the visible energies so that the light column is color corrected, said reflector including a transparent substrate of high-heat resisting material, and coating means on the substrate reflecting at least substantially all infrared radiant energies in the general range of .80 to 1.5 microns and substantially all visible radiant energies in the general range of .40 to .75 micron except that portion in the general range of .63 to .69 micron, whereby the resultant reflected visible energies produce a light column having a predetermined color temperature.

3. The combination as defined by claim 2, wherein said coating means includes a plurality of films applied to one side of said substrate.

4. The combination as defined by claim 2, wherein said coating means includes a plurality of films applied to both sides of said substrate.

5. The combination as defined by claim 2, wherein said coating means reflects over 90% of the infrared energies in said range and over 90% of the visible energies except in said range of .63 to .69 micron.

6. The combination as defined in claim 5, wherein the color temperature is at least 3200° K.

7. A reflector for reflecting radiant energies from a source to define a light column having a predetermined spectral content comprising a transparent substrate of high-heat resisting material, and coating means on the substrate reflecting at least substantially all infrared radiant energies in the general range of .80 to 1.5 microns and substantially all visible radiant energies in the general range of .40 to .75 micron except that portion in the general range of .63 to .69 micron whereby the resultant reflected visible energies produce a light column having a predetermined color temperature.

8. A reflector as defined in claim 7, wherein said coating means reflects over 90% of the infrared energies in said range and over 90% of the visible energies except in said range of .63 to .69 micron.

References Cited

UNITED STATES PATENTS

| | | | |
|---|---|---|---|
| 2,552,185 | 5/1951 | Koch | 88—106 |
| 2,854,349 | 9/1958 | Dreyfuss et al. | 88—106 |
| 3,099,403 | 7/1963 | Strawick | 240—47 |

NORTON ANSHER, *Primary Examiner.*

C. C. LOGAN, *Assistant Examiner.*